United States Patent Office 2,758,566
Patented Aug. 14, 1956

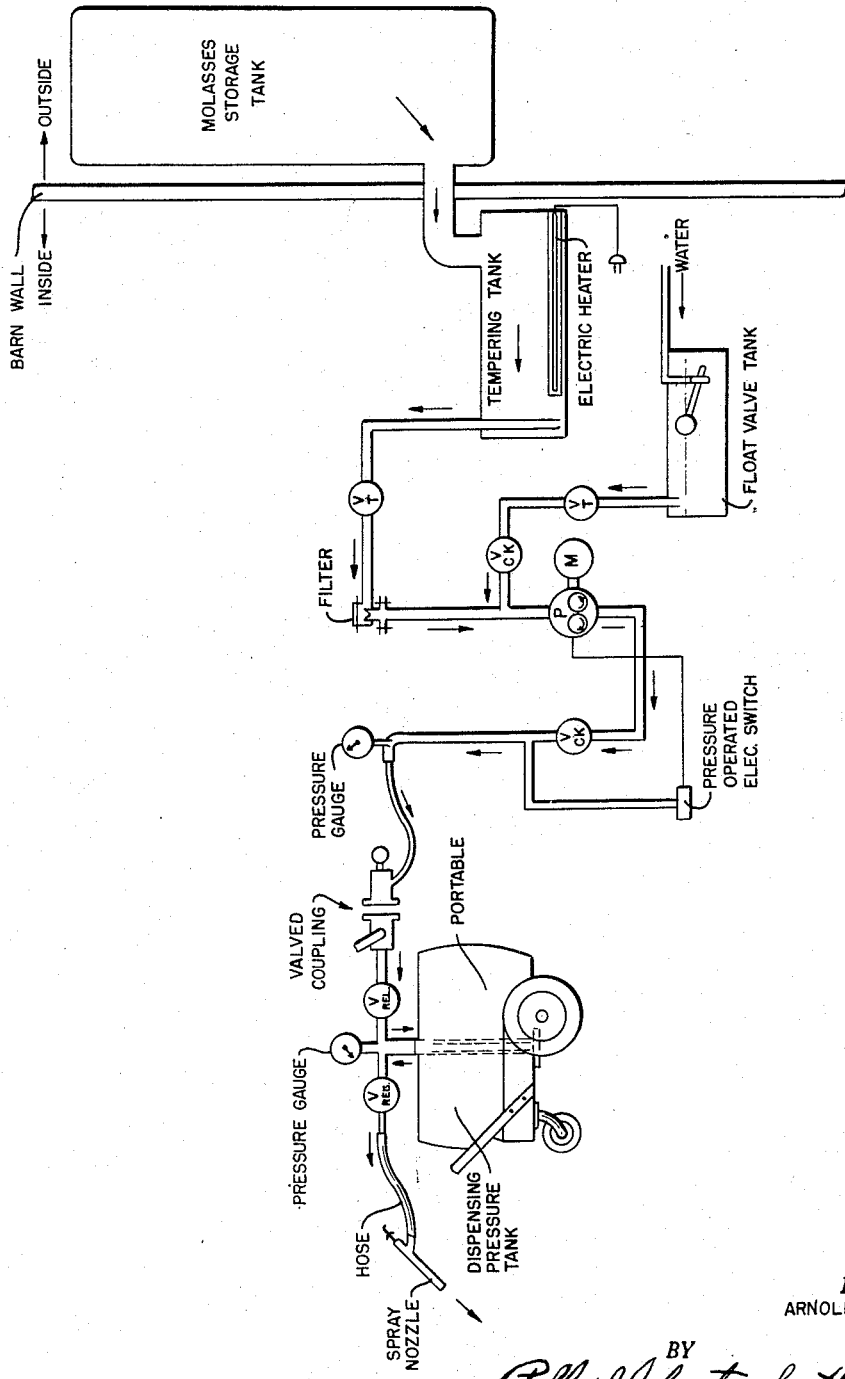

2,758,566

DISPENSING SYSTEM FOR APPLYING MOLASSES TO STOCK FEED

Arnold M. Talbott, Rye, N. Y.

Application July 8, 1955, Serial No. 520,735

2 Claims. (Cl. 119—51)

This invention relates to a dispensing system for storing, tempering, flowing and applying molasses in controlled amounts to feed to be used for livestock. Cold molasses is a viscous, non-readily flowable mass not easily handled by dairymen or stock feeders on farms.

When molasses is used or piped in large quantities in commercial operations, pumping of the liquid in cool weather is ordinarily facilitated by means of a high capacity heater capable of raising the temperature of the molasses in the flow line to a level at which the viscosity is lowered to a point where ready flow is obtainable in large pipes. However, molasses is used in relatively small quantities for the feeding of stock on farms and high capacity heating equipment cannot economically be employed. Although the body heat given off by cattle increases the temperature in dairy barns to a surprising degree, the atmosphere therein in cool weather is not warmed sufficiently to permit ready flow and distribution of commercial molasses of standard grade in small pipes.

Most dairy farms using molasses receive the same in drums, and the dairymen dispense the liquid therefrom in cans but this method of operation is so time consuming and messy that such requirements have been a deterent to the utilization of molasses on farms as a feed supplement for cattle and other stock in spite of the known nutritive value of molasses. The initial cost of an insulated storage tank and heater for the molasses and the running cost of heating the same are prohibitively high for many farms.

The instant applicant has previously proposed a system in which molasses is heated somewhat if it is too cold to flow adequately, next is diluted with water and then pumped through a network of small pipes throughout the dairy or to the various feeding stations. While this system is effective, the installation costs are unnecessarily high, and sometimes are excessively high for smaller operators.

An object of the present invention is to provide a dispensing system for the application of molasses to feed for stock on farms which involves low cost of materials and construction to the fabricator and to the livestock owner, very low outlay for installation, and low costs in connection with its operation. Another object is to provide a heating and pumping installation having relatively low wattage requirements such that the equipment can be connected into the ordinary electric light circuit available in the usual dairy barn.

The dispensing system of the present invention capable of economically distributing molasses at all temperatures involves the combination of a large bulk storage tank suitable for outdoor mounting, an auxiliary tempering tank connected to the storage tank preferably having a heating means therein and mounted inside a barn or other enclosure for stock feeding, a discharge pipe connected to said tempering tank, a portable dispensing pressure tank, a high pressure pump in said pipe for drawing the molasses from the tanks, for mixing it with water and for forcing it after dilution through a hose and coupling to said dispensing tank, and a tap water inlet pipe leading into the suction pipe connecting the tempering tank and the pump, for diluting the molasses flowing to the pump.

In very cold weather, the storage tank being outside of the barn, the application of heat to the molasses in the tempering tank is necessary to permit the liquid to flow to the pump. Dilution of the molasses with water serves several functions necessary for the operation of the molasses dispensing system of the invention. First, it reduces the viscosity of the molasses to a level where it spreads readily through the feed and avoids difficulties in swallowing by the livestock. It also reduces the heat requirements to obtain flow and lessens the power necessary for pumping the molasses. The cost of the equipment and of operation is thus provided at an acceptable level for the average dairyman or other livestock feeder. If the pipes or conduits were left full of undiluted molasses even though it has been initially heated, the molasses would set-up or congeal when it cools and thus it would be difficult to start circulation again at the time of the next use.

In weather which is not so cold, it may not be necessary to use the heater, for the body heat of the livestock in the barn or other enclosure is sufficient to permit the pump to draw the molasses. In warm or summer weather, of course, no heating is required.

The invention is illustrated by the accompanying drawing wherein the various elements are diagrammatically represented. With reference thereto, there is shown a large uninsulated vented storage tank of 1000 to 3000 gallon capacity situated outside of the wall of the dairy barn or other stock feeding enclosure, mounted in such manner as to provide gravity flow from the outlet thereof. This storage tank is connected through the wall of the barn to, and substantially at one end of, an elongated tempering or heating tank by means of a plastic or black iron pipe of short length (preferably under six feet) and of large capacity (four inch) to facilitate flow of cold or unheated viscous molasses. The tempering tank of fifty gallon capacity is provided with an electrical immersion heater extending substantially along the whole length of the tank and supported substantially at the bottom of the same. The heating element is preferably controlled by a thermostat, not shown, and may be of the relatively low wattage type, preferably operating on 500 watts. It may be, and preferably is, composed of wires or rods mounted in a metal tubing. Alternatively, it may be a conventional cable heating element available on the market, the wires of which have been coated with a flexible material resistant to the action of the components of molasses at the high surface temperatures encountered. The structure of the heater should be such as to provide a large amount of surface at temperatures insufficient to cause decomposition or carbonization of the molasses.

The end of the tempering tank opposite the end containing the inlet has a discharge conduit leading from the bottom of the tank to and through a filter to an electrically operated pressure pump of substantial power. This discharge conduit preferably is of a diameter of at least two inches and should be quite short in order to facilitate flow to the pump. A one-half horsepower rotary gear pump operating at 1150 R. P. M., 60 cycle, single phase on 110 volts is satisfactory. This high power pump serves a secondary but essential function of blending the water with the viscous molasses such that a homogeneous readily flowable mass is obtained.

A small water pipe (three-eighths inch) is connected into a vertical section of the pipe connecting the tempering tank with the pump and is positioned to discharge water into the molasses as it goes into the pump. The water is preferably introduced into the system by the suction of the molasses being drawn through the pump. The pipe line carrying the water draws the same from a float-valve tank. A simple check valve is provided in the line to prevent backflow. Less advantageously the water may be supplied under pressure provided by means of a pressure regulating valve.

The pipe line leaving the pump and carrying the diluted molasses is provided with an electric pressure cut-off switch and connects with a portable, pressure-operated dispensing tank through a flexible hose having therein a quickly operated or snap valve coupling, the coupling being of a type having valves at each facing whereby no molasses can flow out of either half of the coupling when the same is disconnected. The dispensing pressure tank or cart is also provided with a discharge conduit connected to a flexible hose terminating in a nozzle, preferably of the spraying type.

In operation of the system of the invention, molasses purchased at bulk price is delivered to and stored in the large storage tank. In use molasses will flow from this tank through the barn wall to the tempering tank by the action of the pump and gravity. In this tank the molasses will be heated by the heat in the barn, and if necessary because of very cold weather, also by the electric heater in the bottom of the tempering tank, thereby to provide the heat required to reduce the viscosity of the molasses to a pumpable level. A suitable temperature level in the tempering tank usually is between about 50° and 80° C. This heating should be commenced an adequate time ahead of the stock feeding time to permit the low-wattage heater to raise the temperature to the desired level. In view of the slow rate at which molasses will take up heat, the tempering tank is of a capacity sufficient to provide molasses for a single feeding or a single day's feeding. Water is sucked into the warmed molasses as the molasses is drawn into the pump, the amount added ordinarily being only that necessary to obtain required flowing and spraying qualities. As little as 5 to 15% water is all that is required. The introduction of one part of water into ten parts of molasses is usually sufficient.

The dispensing pressure tank is maintained constantly under air pressure and the diluted molasses is forced into the tank against the air pressure. When the desired quantity of molasses has been introduced into the tank or cart the coupling from the pump line is disconnected and the cart is wheeled around the dairy or other enclosure to the various feeding stations or positions where the molasses is pressure-sprayed on the roughage or feed. The dilute molasses of low viscosity when sprayed on the feed will penetrate and cover the surfaces thereof and be easily consumed by the animals.

For charging the dispensing tank with the diluted molasses, it is wheeled into place and connected by the snap-on coupling at the molasses supply line. The pressure gauge on the dispensing tank should read from 80 to 85 pounds air pressure. The pump is then switched on and the pumping operation continued until the pressure gauge reaches 140–150 pounds. At this time about 32 gallons of molasses will have been introduced into the dispensing tank and the time required to accomplish the filling is approximately eight minutes. When the tank is filled, the pressure cut-off switch stops the motor automatically. The water supply automatically cuts off as soon as the motor stops. Thereupon the dispensing unit is disconnected at the coupling and is ready for wheeling to the feeding stations.

The dispensing tank will deliver dilute molasses at from 70 to 80 pounds constant pressure. The molasses from this loading will feed a herd of 64 cattle at the rate of five pounds each. When the molasses has been discharged from the dispensing tank the air pressure therein will fall to about 80 pounds and the tank can be again filled at the time of the next feeding operation.

It should be understood that the present invention is not limited to the specific details of construction herein described, but that it extends to all equivalents which will occur to those skilled in the art upon consideration of the scope of the claims appended hereto.

I claim:

1. A molasses feeding system for livestock in dairies, barns and the like, which comprises, a bulk storage tank, a tank for tempering adequate molasses for up to one day's feeding of the livestock connected to said storage tank through a pipe of relatively large cross section for flow of viscous molasses, a heater in said tempering tank, a portable pressure tank for delivering molasses to feeding stations, a pipe line connecting said tampering tank with said portable pressure tank, a pump means in said pipe line for withdrawing warm molasses from said tempering tank and for forcing said molasses in diluted form into said pressure tank against compressed air therein, means for introducing water in said pipeline ahead of said pump whereby the molasses and water will be thoroughly mixed in said pump, valve metering means for proportioning said water and molasses, a quick acting coupling in said pipeline between said pump and said compression tank, valves in said pipeline on both sides of said coupling for preventing flow of liquid out of the line when the coupling is open, and a discharge line connected to said compression tank having a valve therein for spreading diluted molasses on feed at feeding stations.

2. A molasses feeding system for cattle in connection with a dairy barn, which comprises, a bulk storage tank, mounted outside the barn, a tank mounted inside the barn and subject to warm atmosphere therein for tempering adequate molasses for up to one day's feeding of the livestock, a pipe of relatively large cross section for flow of viscous molasses connecting said tanks, a portable pressure tank for delivering molasses to feeding stations, a pipe line connecting said tempering tank with said portable pressure tank, a pump means in said pipe line for withdrawing warm molasses from said tempering tank and for forcing said molasses in diluted form into said pressure tank against compressed air therein, means for introducing water into said pipeline ahead of said pump whereby the molasses and water will be thoroughly mixed in said pump, valve metering means for proportioning said water and molasses, a quick acting coupling in said pipeline between said pump and said compression tank, valves in said pipeline on both sides of said coupling for preventing flow of liquid out of the line when the coupling is open, and a discharge line connected to said compression tank having a valve therein for spreading diluted molasses on feed at feeding stations.

References Cited in the file of this patent

UNITED STATES PATENTS

| | | |
|---|---|---|
| 1,458,058 | Hopper | June 5, 1923 |
| 1,691,535 | True | Nov. 13, 1928 |
| 2,007,459 | Pope | July 9, 1935 |
| 2,302,526 | Card | Nov. 17, 1942 |